Figure 1:
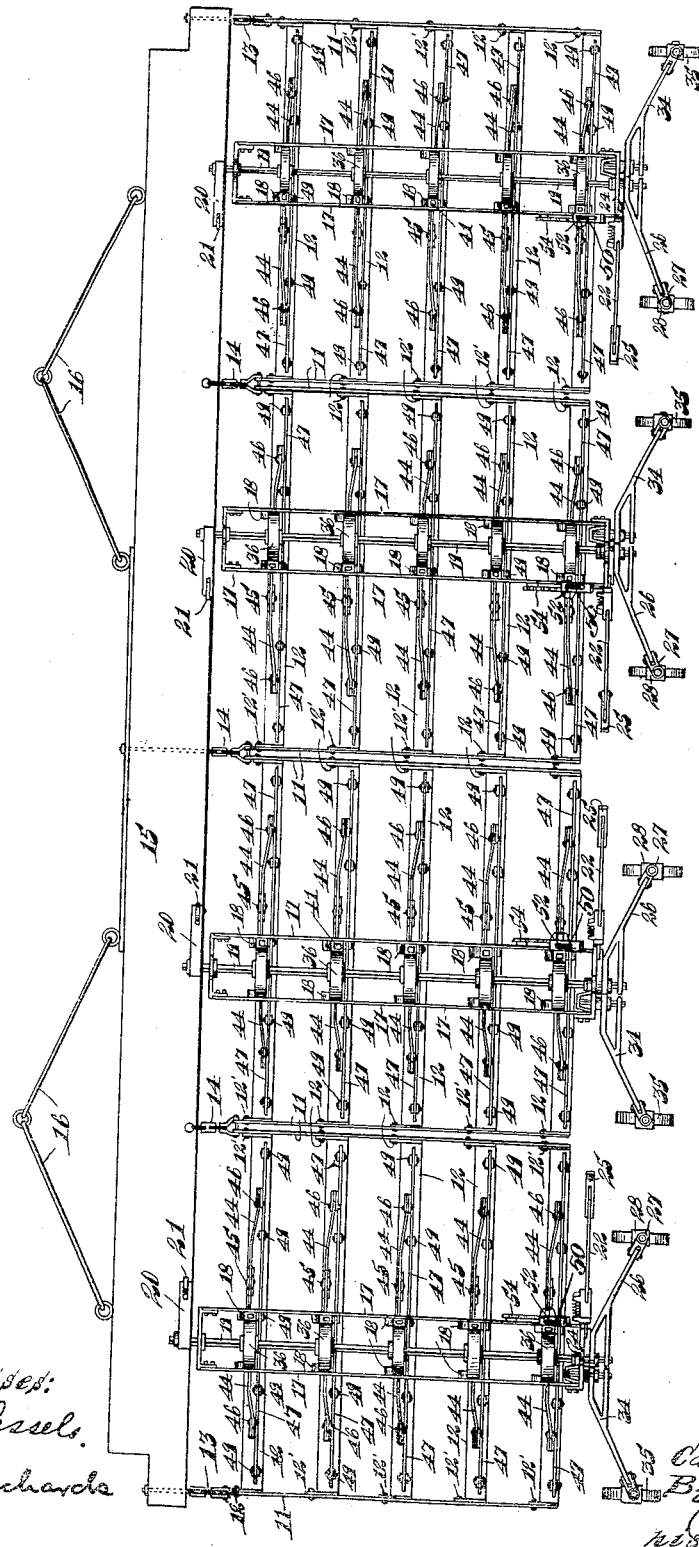

C. ORGAARD.
HARROW.
APPLICATION FILED SEPT. 26, 1916.

1,245,261.

Patented Nov. 6, 1917.
4 SHEETS—SHEET 1.

Witnesses:
C. E. Wessels.
B. J. Richards

Inventor
Carl Orgaard,
his Attorney.

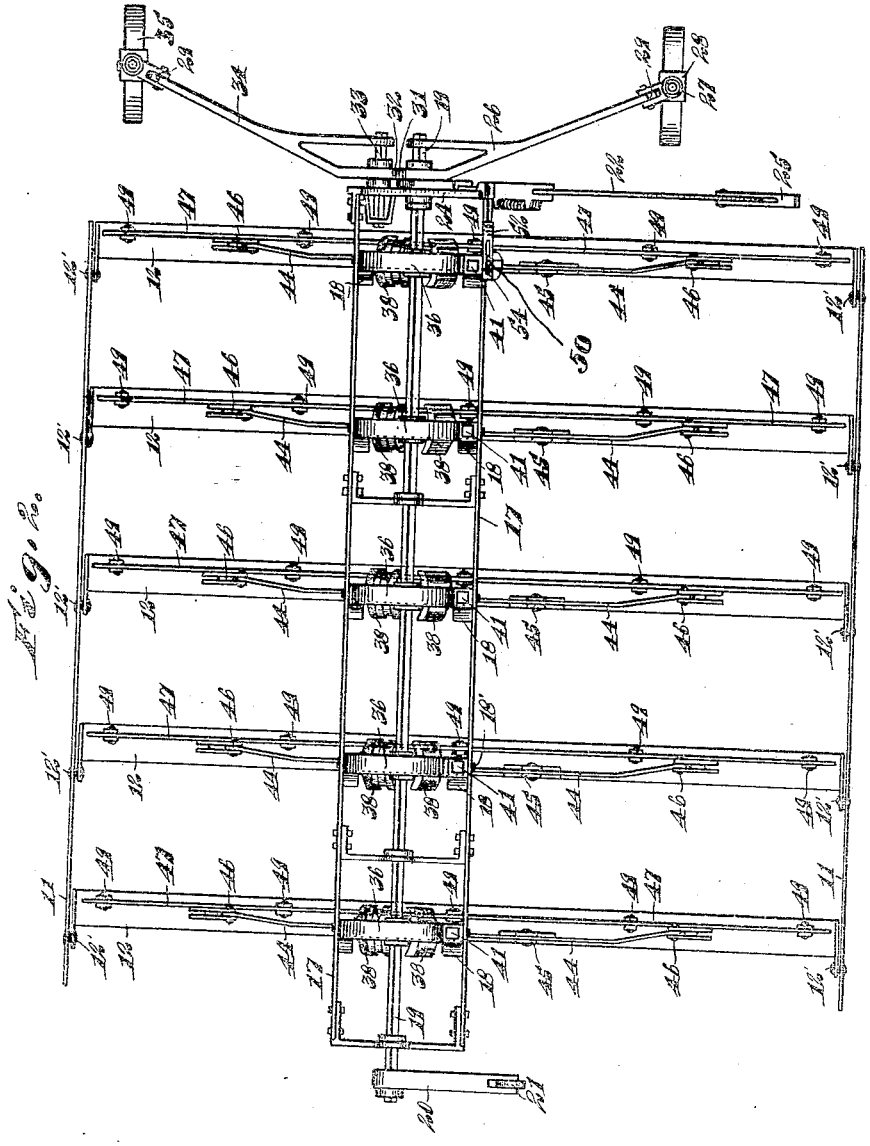

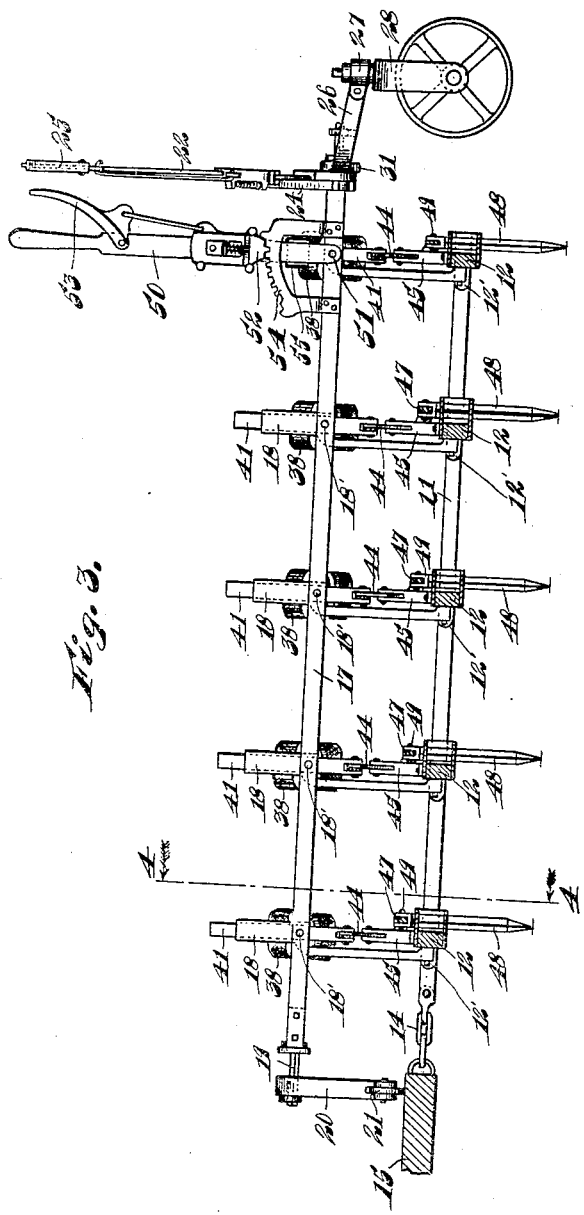

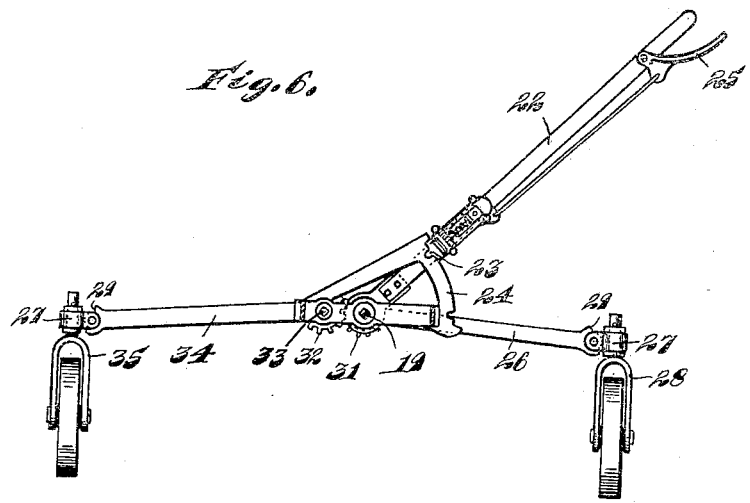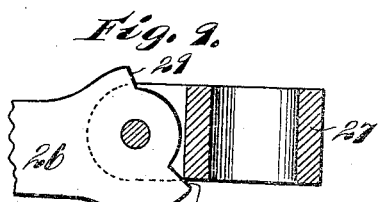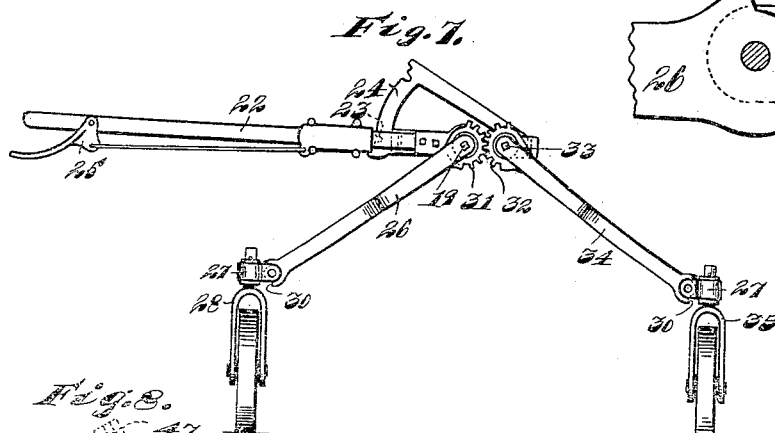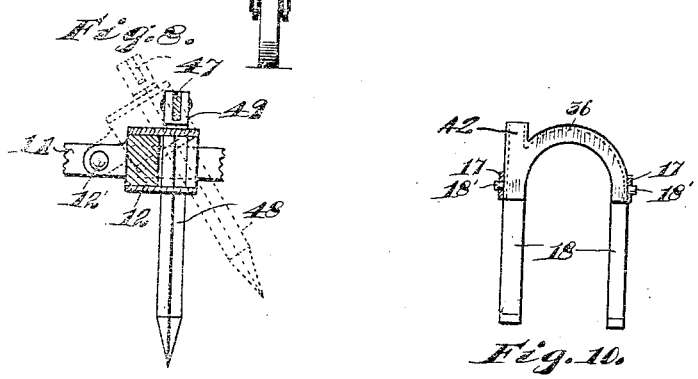

UNITED STATES PATENT OFFICE.

CARL ORGAARD, OF WHEELOCK, NORTH DAKOTA.

HARROW.

1,245,261.  Specification of Letters Patent.  Patented Nov. 6, 1917.

Application filed September 26, 1916. Serial No. 122,215.

*To all whom it may concern:*

Be it known that I, CARL ORGAARD, a citizen of the United States, and a resident of Wheelock, county of Williams, and State of North Dakota, have invented certain new and useful Improvements in Harrows, of which the following is a specification.

My invention relates to improvements in harrows, and has for its object the provision of an improved construction of this character of simple construction and highly efficient in use.

The invention consists in the combinations and arrangements of parts hereinafter described and claimed.

The invention will be best understood by reference to the accompanying drawings forming a part of this specification, and in which, Figure 1 is a top plan view of a harrow embodying my invention, Fig. 2, a top plan view of one of a plurality of harrow sections employed in the construction, Fig. 3, a longitudinal section taken through one of the harrow sections, Fig. 4, a section taken on line 4—4 of Fig. 3, Fig. 5, an enlarged section taken on line 5—5 of Fig. 4, Fig. 6, a vertical section through one of the harrow sections, taken just forward of the rear end, Fig. 7, a rear view of one of the harrow sections, Fig. 8, a detail view illustrating the mounting of the harrow teeth, Fig. 9, a detail view illustrating the mounting of elevating wheels employed on the harrow, and Fig. 10, a detail view illustrating one of a plurality of supporting brackets employed in the construction.

The preferred form of construction, as illustrated in the drawings, comprises a harrow made up of a plurality of harrow frame sections, each of said sections consisting of two side bars 11 having cross channel bars 12 pivotally mounted at 12' therein. Chains 13 and 14 are connected with the forward ends of the side bars of the harrow frame sections and with a draft beam 15 having eveners 16 thereon for draft purposes. A rectangular supporting frame 17 is positioned over each of the harrow sections, being supported on the cross bars 12 by means of supporting brackets 18 and being pivoted to said brackets at 18'. A square operating shaft 19 is mounted in each of the frames 17 and is provided, at its forward end, with a supporting arm 20 carrying at its free end a roller 21 bearing against the top of the draft beam 15. An operating lever 22 is fixed to each of the shafts 19 and is provided with a spring-held locking dog 23 coöperating with a notched segment 24 fixed to the corresponding frame 17, said locking dog 23 being manipulated by means of a handle lever 25 on the lever 22, whereby said lever may be locked in either of its adjusted positions. Each of the shafts 19 carries an oscillating arm 26 having a bracket 27 pivotally mounted at its free end and carrying a caster wheel 28. Each of the arms 26 is provided with stop shoulders 29 and 30 arranged to limit the swing of the bracket 27, as best shown in Fig. 9. Each of the arms 26 is provided with a segmental gear 31 meshing with a segmental gear 32 fixed to a shaft 33 in the corresponding frame 17. Each of the segmental gears 33 is carried by an oscillating arm 34 provided with a caster wheel 35 identical with the caster wheel 28. By this arrangement, it will be observed, that upon oscillation of any one of the shafts 19 by means of the corresponding lever 22, the corresponding caster wheels 28 and 35 and the arm 20 will be operated to elevate or depress the corresponding harrow section in order to facilitate the passage of the same over the ground or a roadway when desired.

Each of the supporting brackets 18 is provided with a segmental housing 36 in which a segmental gear 37 is arranged. Each of the gears 37 is provided with two segmental bearing members 38 diametrically arranged and provided with segmental bearing slots 39 adapted to receive pins 40 fixed to the corresponding shaft 19. A rack bar 41 is arranged to slide in a guide housing 42 and in mesh with the corresponding segmental gear 37, the lower end of each of the rack bars 41 having a slot and pin connection 43 with the inner ends of two operating levers 44 pivoted to brackets 45 and having slot and pin connections 46 at their outer ends with an operating bar 47 arranged over the corresponding cross bar 12. The harrow teeth 48 are made square in cross section and are mounted to slide vertically in square holes provided in the sides of the channel bars 12, the upper end of each of the teeth 48 being pivoted at 49 to the corresponding operating bar 47. The arrangement is such that upon rotation of any one of the shafts 19 to elevate the harrow frame, the harrow teeth will be simultaneously elevated or retracted so as to further facilitate the movements of the harrow and also facilitate the avoidance of entanglement with weeds and the like, when desired.

A second operating lever 50 is pivotally mounted at 51 on each of the frames 17 and carries a spring held locking dog 52 operable by means of a hand lever 53 and cooperating with a notched segment 54 secured to the corresponding frame 17. A channel guide member 55 is pivotally mounted on the corresponding bracket 18 and slidably engages the lever 50, as indicated. The arrangement is such that when desired the operating lever 50 on any one or all of the frames 17 may be tilted forwardly or rearwardly, said forward or rearward tilting of said lever serving also to tilt the corresponding cross bars 12 and consequently tilt the corresponding teeth 48 to further facilitate the passage of the harrow teeth when desired and also permit of tilting adjustments of said teeth in actual harrowing, when desired. The tilting of the harrow teeth, as above described, results in a forward and downward swinging of the corresponding frame 17 which necessitates relative movement between the shaft 19 and the corresponding gears 37, such relative movement being permitted by the form of engagement between the pins 40 and the slots 39, as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A harrow comprising a frame; retractible and tiltable teeth on said frame; and means for simultaneously retracting and tilting said teeth, substantially as described.

2. A harrow comprising a frame; retractible and tiltable teeth on said frame; means for simultaneously retracting and tilting said teeth; and means for elevating or depressing said frame, substantially as described.

3. A harrow comprising a plurality of detachable harrow sections, each of said sections comprising a frame; retractible teeth on said frame; and means for retracting said teeth, substantially as described.

4. A harrow comprising a plurality of detachable sections, each of said sections comprising a frame; retractible teeth on said frame; and means for simultaneously retracting said teeth, substantially as described.

5. A harrow comprising a plurality of detachable sections, each of said sections comprising a frame; retractible and tiltable teeth on said frame; and means for simultaneously retracting and tilting said teeth, substantially as described.

6. A harrow comprising a plurality of detachable harrow sections, each comprising a frame; a draft beam detachably connected with each of said frames; draft means on said draft beams; pivotally mounted channel bars on each of said frames; harrow teeth slidably mounted in said cross bars; and means for simultaneously retracting said teeth and tilting said cross bars, substantially as described.

7. A harrow comprising a plurality of detachable harrow sections, each comprising a frame; a draft beam detachably connected with each of said frames; draft means on said draft beams; pivotally mounted channel bars on each of said frames; harrow teeth slidably mounted in said cross bars; means for simultaneously retracting said teeth and tilting said cross bars; and means for elevating or depressing said frame, substantially as described.

In testimony whereof I have signed my name to this specification in the presence of two subscribing witnesses.

CARL ORGAARD.

Witnesses:
H. B. WINGERD,
H. R. LOMEN.

Copies of this patent may be obtained for five cents each, by addressing the "Commissioner of Patents, Washington, D. C."